United States Patent

Copeland, III

[15] 3,641,518

[45] Feb. 8, 1972

[54] MAGNETIC DOMAIN LOGIC ARRANGEMENT

[72] Inventor: John Alexander Copeland, III, Gillette, N.J.

[73] Assignee: Bell Telephone Laboratories, Incorporated, Murray Hill, N.J.

[22] Filed: Sept. 30, 1970

[21] Appl. No.: 76,883

[52] U.S. Cl. ....................................340/174 TF, 340/174 SR
[51] Int. Cl. ....................................G11c 19/00, G11c 11/14
[58] Field of Search ............................................340/174 TF

[56] References Cited

UNITED STATES PATENTS

| | | | |
|---|---|---|---|
| 3,516,077 | 6/1970 | Bobeck et al. | 340/174 TF |
| 3,518,643 | 6/1970 | Perneski | 340/174 TF |
| 3,530,444 | 9/1970 | Bobeck et al. | 340/174 TF |
| 3,530,446 | 9/1970 | Perneski | 340/174 TF |

*Primary Examiner*—Stanley M. Urynowicz, Jr.
*Attorney*—R. J. Guenther and Kenneth B. Hamlin

[57] ABSTRACT

A single wall domain logic circuit arrangement is realized by a pair of magnetically soft rails on the surface of a material in which domains can be moved. The distance between the rails is reduced over a prescribed portion of the rails to define a position at which domains moving along both rails interact.

6 Claims, 4 Drawing Figures

INVENTOR
J. A. COPELAND, III
BY Herbert M. Shapiro
ATTORNEY

MAGNETIC DOMAIN LOGIC ARRANGEMENT

1. Field of the Invention

This invention relates to data processing arrangements, particularly arrangements which employ single wall domain propagation devices.

2. Background of the Invention

A single wall domain is a magnetic domain encompassed by a single domain wall which closes on itself in the plane of the medium in which it is moved. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

My copending application Ser. No. 049,273, filed June 24, 1970 describes an alternative domain propagation arrangement in which domains move along a magnetically soft rail from input to output positions. The rail has a geometry to define a stable position for a domain to either side thereof permitting a domain to one side of the rail to represent a binary zero and a domain to the other side to represent a binary one.

BRIEF DESCRIPTION OF THE INVENTION

The present invention is directed at the realization of logic functions with the rail propagation arrangement of my above-mentioned copending application. In one embodiment thereof, a logic AND function is realized by modifying the geometry of one of two independently operated shift registers defined by parallel rails. A first of the rails is made to approach the second over a prescribed portion of its length. The separation between the rails over this portion is designed to define an interaction point where the mutual repulsion force between domains on the parallel rails is enhanced.

Further, the lateral position separation force of the first rail is reduced at the specified portion conveniently by increasing the width of the rail there. The separation distance is chosen so that the presence of a domain in each of corresponding positions along the center side of the two rails causes the domain on the first rail to cross the first rail, at the portion where the rails approach one another, because of domain repulsion forces. Since the domain repulsion force is weaker for domains which are further apart, a domain on the exterior side of the second rail will not cause a domain to cross the first rail. After passing the interaction point, a domain is found on the interior side of the first rail only if the domain was on that side before reaching the interaction point and the associated domain on the second rail was, at the same time, on the exterior side. Consequently, a logical AND operation is performed.

DETAILED DESCRIPTION

Figure 1:
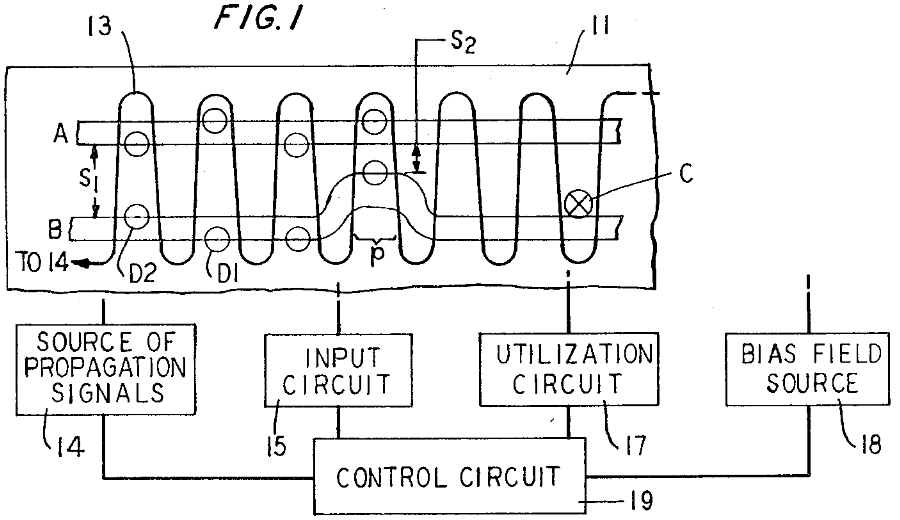
FIGS. 1, 2, 3, and 4 are schematic representations of a domain rail logic circuit arrangement in accordance with this invention, showing positions of magnetic domains therein during operation.

FIG. 1 shows a single wall domain rail logic arrangement in accordance with this invention. The arrangement comprises a sheet 11 of a magnetic material in which single wall domains can be moved.

Magnetically soft overlay rails (alternatively grooves in the surface of sheet 11) A and B are provided on a surface of sheet 11. Each of rails A and B has a cross-sectional geometry to ensure a stable position for domains to either side of it, that is to say, above and below it as illustrated in the figure by domains D1 and D2. The rails are shown as being incomplete. In practice, each rail typically continues to form a closed loop for recirculating information. In such a system, a domain to a reference side of the rail (viz, bottom) represents a binary zero, and a domain to the other side (top) represents a binary one.

A number of stages along rails A and B are defined by a pair of offset serpentine propagation conductors represented by serpentine line 13 of FIG. 1. Line 13 illustratively couples both rails. Each conductor represented by line 13 is connected between a source of propagation signals represented by block 14 in FIG. 1 and ground. Consecutive domains pairs are shown occupying consecutive like stages with respect to line 13 along the rails. These domain pairs represent all the binary possibilities (A,B)=(1,1), (0,0), (1,0), and (0,1) as viewed from right to left in FIG. 1. It will be shown that an output is provided only under the condition (A,B)=(1,1) indicating the performance of an AND function.

In a single rail propagation system, a domain is normally present in each stage of the shift register occupying a position to one side or the other of a rail as determined by an input arrangement assumed present for each rail and represented by a block 15 in FIG. 1. A suitable input is shown in my aforementioned copending application. Similarly, the presence of a domain is detected at a position indicated by the encircled X sign to the right in FIG. 1 by a utilization circuit represented by block 17.

The diameter of domains herein is maintained constant by a familiar bias field represented by block 18 in FIG. 1. Sources 14 and 18 and circuits 15 and 17 herein are connected to a control circuit 19 for synchronization and activation. The various sources and circuits may be any such circuits capable of operating in accordance with this invention, consistent with the teaching of my above-mentioned copending application.

The domain pair pattern shown in FIG. 1 is provided conveniently by means of source 15 for movement to the right as viewed in FIG. 1 as propagation signals are supplied by source 14. The domain patterns propagate unchanged until portion P of rail B is reached. Normally, rails A and B are spaced a distance S1 apart. At this distance, a domain can be moved along the top or bottom of rail A without interfering with a domain being moved synchronously along the top or bottom of rail B respectively.

At portion P of rail B, on the other hand, this is not the case. Rail B is disposed more closely to rail A at portion P defining an area between the two rails separated by a distance $S2<S1$ where the repulsion force between domains on the interior sides of both rails is only slightly less than the force normally required to move a domain laterally under a rail to the other side. Furthermore, rail B is modified along this portion so that less force is required to make a domain cross the rail. Consequently, the presence of two domains, one along the interior side of each rail as represented in FIG. 1 by the leftmost domain pair, is characterized by an interaction which causes domain D2 there to cross rail B. This situation is represented by (A,B)=(0,1) (see FIG. 2) and yields the absence of a domain at the detector at an appropriate later time.

Figure 2:
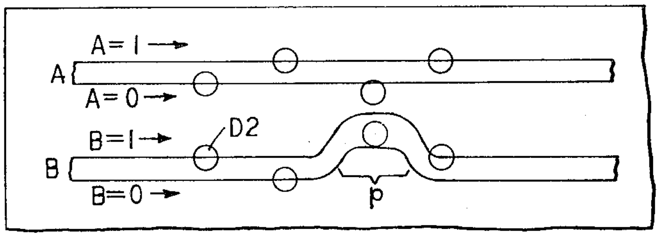
Figure 3:
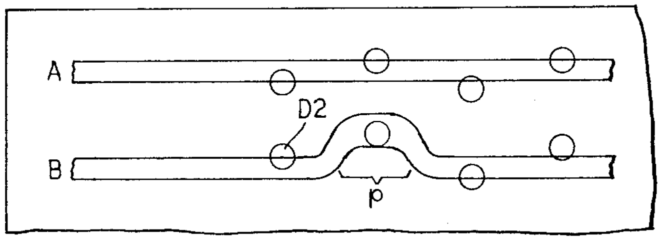
Figure 4:
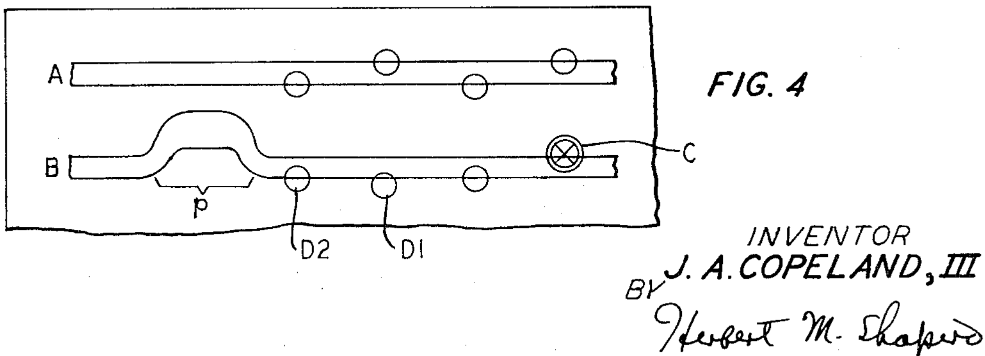

FIGS. 2, 3, and 4 show the consecutive domain pairs of FIG. 1 in consecutive positions along the rails as a propagation operation proceeds. Because of the relatively large separation, the repulsion force between domains of the first three pairs is not sufficient in each instance to alter the lateral position of either domain. In the case of the fourth pair, the center-to-center spacing of the domain is smaller than is the case with the first three pairs and the repulsion force is sufficient to cause domain D2 to cross rail B to the bottom side as already described. Consequently, only a domain moving along the top of rail B synchronously with a domain moving along the top of rail A, the situation depicted at P in FIG. 1 symbolized by (AB,)=(1,1) or A·B=1, permits a domain to pass portion P and arrive at the detector (at C) as shown in FIG. 4. It is to be noted that domain D2 has its position changed as is clear from a comparison of FIGS. 3 and 4. Therefore, the following (logical AND) truth table is realized:

TABLE I

| A | B | C |
|---|---|---|
| 1 | 1 | 1 |
| 0 | 0 | 0 |
| 1 | 0 | 0 |
| 0 | 1 | 0 |

The optimum width of a magnetically soft rail for defining stable domain positions to either side thereof is about 0.45 domain diameters. In accordance with this invention, it is advantageous to change the width of the rail in portion P in order to permit a domain interaction to move a domain across the rail more easily there. This change may be either an increase or decrease in width of the rail form the optimum width. The figures show rail B as having an increased width in portion P for this purpose. In a typical example, a 150 micrometer diameter domain is moved in yttrium orthoferrite 75 micrometers thick along a permalloy rail 75 micrometers wide and 50 nanometers thick. The portion P extends over a single stage of the rail and the width of the rail in the portion is enlarged from 75 micrometers to 100 micrometers. The center-to-center spacing between rails in such an arrangement is reduced from 450 micrometers to 350 micrometers at portion P.

What has been described is considered merely illustrative of the principles of this invention. Accordingly, various alternatives may be devised in accordance with those principles within the spirit and scope of this invention.

What is claimed is:

1. A single wall domain logic circuit comprising a sheet of magnetic material in which single wall domains can be moved, first and second rails energy coupled to said sheet, each of said rails having properties and a first geometry to define laterally displaced stable positions for a domain to first and second sides thereof, means for generating in said sheet repetitive magnetic field patterns for moving domains from stage to stage along said rails, said first rail being spaced apart from said second rail a first distance at which repulsion forces exhibited between domains moving therealong produce only negligible effects, said first rail including a first portion spaced apart from said second rail a second distance less than said first distance such that said repulsion forces between associated domains on said first and second rails change the lateral position of a domain on the second rail.

2. A circuit in accordance with claim 1 wherein each of said rails comprises a magnetically soft overlay film.

3. A circuit in accordance with claim 1 wherein each of said rails comprises a groove in said sheet.

4. A circuit in accordance with claim 1 wherein said first portion of said first rail has a second geometry to permit the interaction forces between domains there to move a domain thereacross.

5. A circuit in accordance with claim 1 also including means for providing domains to said first and second sides of said first and second rails selectively and means for detecting the presence and absence of domains moved across said first rail because of said domain interaction.

6. A circuit in accordance with claim 2 wherein said first portion encompasses a single one of said stages.

* * * * *